United States Patent
Herzog

(10) Patent No.: US 12,240,166 B2
(45) Date of Patent: *Mar. 4, 2025

(54) METHOD FOR PRODUCING A THREE-DIMENSIONAL COMPONENT

(71) Applicant: Concept Laser GmbH, Lichtenfels (DE)

(72) Inventor: Frank Herzog, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,857

(22) Filed: Aug. 24, 2023

(65) Prior Publication Data

US 2023/0390997 A1    Dec. 7, 2023

Related U.S. Application Data

(63) Continuation of application No. 17/060,745, filed on Oct. 1, 2020, now Pat. No. 11,760,006, which is a
(Continued)

(30) Foreign Application Priority Data

Oct. 28, 2013    (DE) .......................... 102013017792.8

(51) Int. Cl.
*B29C 64/153*    (2017.01)
*B22F 10/28*    (2021.01)
(Continued)

(52) U.S. Cl.
CPC ............ *B29C 64/153* (2017.08); *B22F 10/28* (2021.01); *B22F 10/366* (2021.01);
(Continued)

(58) Field of Classification Search
CPC .......... B22F 10/20; B22F 10/28; B22F 10/30; B22F 10/366; B22F 10/368; B22F 12/43;
(Continued)

(56) References Cited

U.S. PATENT DOCUMENTS

| | | | |
|---|---|---|---|
| 5,427,733 A | 6/1995 | Benda et al. | |
| 6,325,961 B1 | 12/2001 | Beers et al. | |

(Continued)

FOREIGN PATENT DOCUMENTS

| | | | |
|---|---|---|---|
| CN | 102962452 A | 3/2013 | |
| CN | 103025507 A | 4/2013 | |

(Continued)

*Primary Examiner* — Philip C Tucker
*Assistant Examiner* — Jimmy R Smith, Jr.
(74) *Attorney, Agent, or Firm* — Dority & Manning, P.A.

(57) ABSTRACT

The invention relates to a method for producing a three-dimensional component by an electron-beam, laser-sintering or laser-melting process, in which the component is created by successively solidifying predetermined portions of individual layers of building material that can be solidified by being exposed to the effect of an electron-beam or laser-beam source (2) by melting on the building material, wherein thermographic data records are recorded during the production of the layers, respectively characterizing a temperature profile of at least certain portions of the respective layer, and the irradiation of the layers takes place by means of an electron beam or laser beam (3), which is controlled on the basis of the recorded thermographic data records in such a way that a largely homogeneous temperature profile is produced, wherein, to irradiate an upper layer, a focal point (4) of the electron beam or laser beam (3) is guided along a scanning path (17), which is chosen on the basis of the data record characterizing the temperature profile of at least certain portions of the layer lying directly thereunder or on the basis of the data records characterizing the temperature (Continued)

Figure 1:
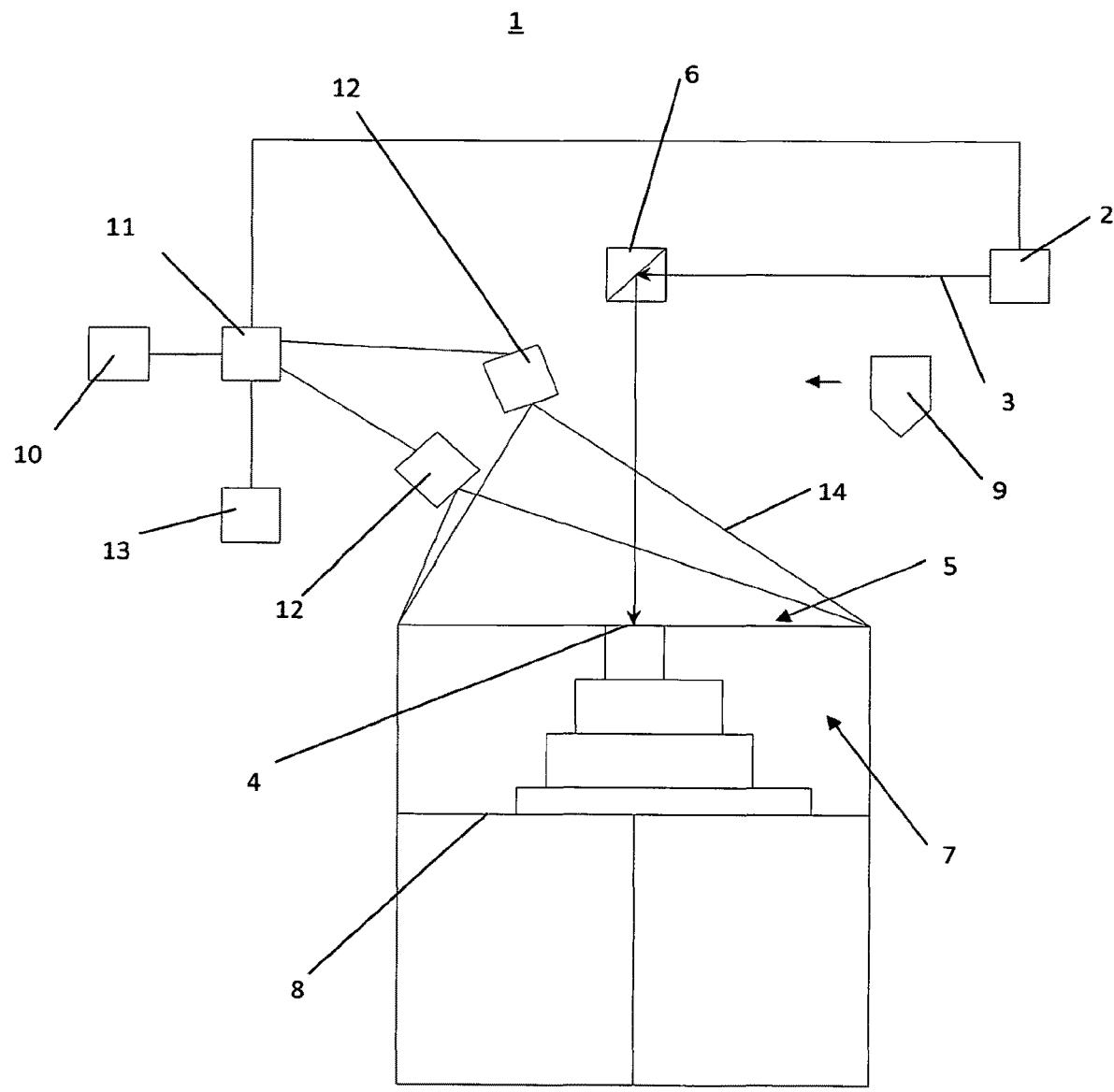

profiles of at least certain portions of the layers lying thereunder.

15 Claims, 3 Drawing Sheets

Related U.S. Application Data continuation of application No. 15/031,938, filed as application No. PCT/DE2014/000535 on Oct. 22, 2014, now Pat. No. 10,807,192.

(51) Int. Cl.

| | |
|---|---|
| *B22F 10/366* | (2021.01) |
| *B22F 10/368* | (2021.01) |
| *B22F 12/43* | (2021.01) |
| *B22F 12/49* | (2021.01) |
| *B22F 12/90* | (2021.01) |
| *B23K 15/00* | (2006.01) |
| *B23K 15/02* | (2006.01) |
| *B23K 26/03* | (2006.01) |
| *B23K 26/082* | (2014.01) |
| *B23K 26/144* | (2014.01) |
| *B23K 26/342* | (2014.01) |
| *B29C 64/268* | (2017.01) |
| *B29C 64/386* | (2017.01) |
| *B29C 64/393* | (2017.01) |
| *B33Y 10/00* | (2015.01) |
| *B33Y 50/02* | (2015.01) |
| *B33Y 30/00* | (2015.01) |

(52) U.S. Cl.
CPC ............ *B22F 10/368* (2021.01); *B22F 12/49* (2021.01); *B22F 12/90* (2021.01); *B23K 15/002* (2013.01); *B23K 15/0086* (2013.01); *B23K 15/02* (2013.01); *B23K 26/034* (2013.01); *B23K 26/082* (2015.10); *B23K 26/144* (2015.10); *B23K 26/342* (2015.10); *B29C 64/268* (2017.08); *B29C 64/386* (2017.08); *B29C 64/393* (2017.08); *B22F 12/43* (2021.01); *B22F 2203/11* (2013.01); *B33Y 10/00* (2014.12); *B33Y 30/00* (2014.12); *B33Y 50/02* (2014.12); *Y02P 10/25* (2015.11)

(58) Field of Classification Search
CPC ...... B22F 12/49; B22F 12/90; B22F 2203/11; B22F 3/1055; B22F 2003/1056; B22F 2003/1057; B22F 2003/1058; B22F 2003/1059; B23K 15/002; B23K 15/0086; B23K 15/02; B23K 26/034; B23K 26/082; B23K 26/144; B23K 26/342; B29C 64/153; B29C 64/182; B29C 64/268; B29C 64/386; B29C 64/393; Y02P 10/25; B33Y 10/00; B33Y 30/00; B33Y 50/02

See application file for complete search history.

(56) References Cited

U.S. PATENT DOCUMENTS

| | | | |
|---|---|---|---|
| 6,925,346 | B1 | 8/2005 | Mazumder et al. |
| 7,537,722 | B2 | 5/2009 | Andersson et al. |
| 9,073,265 | B2 | 7/2015 | Snis |
| 9,952,236 | B2 | 4/2018 | Satzger et al. |
| 10,265,912 | B2 | 4/2019 | Herzog et al. |
| 11,458,540 | B2 | 10/2022 | Domrose |
| 11,760,006 | B2 * | 9/2023 | Herzog ............... B29C 64/386 264/497 |
| 2004/0081221 | A1 | 4/2004 | Sandvoss |
| 2004/0200816 | A1 | 10/2004 | Chung et al. |
| 2009/0206065 | A1 | 8/2009 | Kruth et al. |
| 2011/0061591 | A1 | 3/2011 | Stecker |
| 2012/0100031 | A1 | 4/2012 | Ljungblad |

FOREIGN PATENT DOCUMENTS

| | | |
|---|---|---|
| CN | 103338880 A | 10/2013 |
| DE | 102004017769 A1 | 12/2004 |
| DE | 102004017764 A1 | 10/2005 |
| DE | 112008000030 T5 | 9/2009 |
| DE | 102011009627 A1 | 8/2012 |
| EP | 1033229 A2 | 9/2000 |
| EP | 1568472 A1 | 8/2005 |
| EP | 1748878 B1 | 4/2010 |
| WO | WO01/81031 A1 | 11/2001 |
| WO | WO2004/056509 A1 | 7/2004 |
| WO | WO2008/096105 A1 | 8/2008 |
| WO | WO2012/019577 A2 | 2/2012 |
| WO | WO2012/102655 A1 | 8/2012 |
| WO | WO2013/021173 A1 | 2/2013 |

\* cited by examiner

METHOD FOR PRODUCING A THREE-DIMENSIONAL COMPONENT

CROSS-REFERENCE TO RELATED APPLICATIONS

This application is a continuation of U.S. patent application Ser. No. 17/060,745 filed Oct. 1, 2020, which claims priority to U.S. patent application Ser. No. 15/031,938 filed Apr. 25, 2016, which claims priority to International Patent Application Serial No. PCT/DE 2014/000535 filed Oct. 22, 2014, which claims priority to German Patent Application Serial No. 10 2013 017 792.8 filed Oct. 28, 2013. The contents of these applications are incorporated herein by reference in their entirety as if set forth verbatim.

The invention relates to a method for producing a three-dimensional component by way of an electron beam, laser sintering or laser melting method, in which the component is created by successively solidifying predetermined sections of individual layers of building material solidifiable by the action of an electron or laser radiation by way of fusion of the building material, having the further features of the preamble of claim 1.

Moreover, the invention relates to an apparatus for selective laser powder processing, embodied to carry out the method for producing the three-dimensional component.

The prior art has disclosed methods which are usually referred to as laser sintering or laser melting methods. In such methods, layers made of building material are applied, said layers being heated locally by the action of radiation, in particular electron or laser radiation, to solidify at the points corresponding to the cross section of the object to be produced. Here, there may be a connection to a layer lying therebelow. For irradiation purposes, a focal point of the laser beam is typically guided along a scanning path selected in such a way that the cross section of the object to be produced is completely covered.

Correspondingly, apparatuses for selective laser powder processing embodied thus have a building platform for receiving a powder bed made of solidifiable building material, a powder coating system for applying a powder layer onto the building platform, a laser radiation source for providing the focused laser beam, a scanning device for guiding the focused laser beam along the scanning path and a control device. The control device is embodied to control the laser radiation source in a manner dependent on building data characterizing the three-dimensional form of the object to be produced; it comprises electronic storage media which interact with a scanner for deflecting the laser beam.

Although such electron beam melting or sintering methods or laser melting or laser sintering methods were found to be efficient means for producing components, it was found to be disadvantageous when large temperature gradients in the layer to be solidified during the production of the object are generated. Such high temperature gradients can lead to the generation of cracks in the produced material and, in general, adversely affect the quality of the produced object. Moreover, local overheating may occur, leading to the local melting bed generated by the laser beam assuming larger dimensions than originally envisaged. This adversely affects the accuracy of the production method or leads to material unevennesses such as burrs and the like being created, which need to be removed with much outlay after the production of the object.

Therefore, it is advantageous if the action of temperature caused by the laser beam is as uniform as possible during the production of the three-dimensional object. To this end, US 2004/0200816A1 proposes the provision of at least one thermographic detector for acquiring data records which characterize, at least in sections, the temperature profiles of layers consisting of solidified building material. In order to equalize the occurring temperature gradients, a heating device is controlled appropriately or process parameters of the laser, in particular the scanning speed and/or the laser power are adapted, in order to control the temperatures over the coater plane.

Proceeding from this prior art, it is an object of the present invention to specify a method in which local overheating of the applied building material is avoided and temperature gradients occurring during the production are minimized. Furthermore, it is an object of the invention to specify an apparatus suitable for efficiently carrying out this method.

The object is achieved by a method of the type set forth at the outset having the characteristic features of patent claim 1. In respect of the apparatus, the object is achieved by an apparatus for selective laser processing, which is embodied to carry out the method according to the invention.

In a method for producing a three-dimensional component by way of an electron beam, laser sintering or laser melting method, at least one data record is generated, which characterizes at least partially the temperature profile of at least on layer directly below the upper layer to be irradiated. As an alternative or in addition thereto, data records are generated which characterize, at least in sections, the temperature profiles of the layers lying below the upper layer. A thermographic acquisition of the irradiation plane is provided for generating the data records. During the irradiation of the upper layer, a focal point of the laser beam is guided along a scanning path, selected in a manner dependent on the data record or records acquired thermographically, for the purposes of generating a largely homogeneous temperature profile. In particular, provision is made during the irradiation of the upper layer for regions which have a high temperature due to preceding radiation action to be omitted initially and for the irradiation process to be continued at different points.

In more complex cases, the thermographic acquisition identifies regions in which elevated temperatures prevail, in particular higher temperature in comparison with the temperatures prevailing in the surrounding regions. Thus, these are local temperature maxima which are acquired. The scanning path is selected in such a way that these surrounding regions are initially irradiated such that there can be an equalization of the temperature gradient. At the same time, there is dissipation of heat in the hot region, for example by heat transfer to the surroundings by way of convection. As a result, the temperature gradient prevailing between the regions is equalized and the region previously too hot can be irradiated after the irradiation of the surrounding regions is completed, without there being a risk of overheating, in the case of which a melting zone that is too large could be created.

Preferably, the irradiation of the upper layer is controlled in such a way that an energy influx per unit area imparted by the laser beam onto the upper layer of the applied powdery construction material is adapted in a manner dependent on the data record or records which characterize, at least in sections, the temperature profiles of the layers lying under the upper layer. Thus, in addition to adapting the scanning path to the acquired temperature profile or profiles, provision is made for an adaptation of process parameters modifying the energy influx per unit area to be undertaken in order to further counteract excessive local heating.

Process parameters which are modified to adapt the energy influx per unit area preferably comprise a scanning speed of the laser beam, a size of the focal point, a laser pulse frequency, a laser pulse duration and/or a laser power.

Therefore, in accordance with alternative embodiments, provision is made for the irradiation of the layers to be undertaken by means of pulsed or continuous laser irradiation. It is understood that the corresponding apparatuses are embodied in such a way that these process parameters are correspondingly modifiable. Thus, in particular, the laser pulse frequency, the laser pulse duration and/or the laser power of a laser radiation source embodied to provide the laser beam is/are regulable. A scanning device embodied to deflect the laser beam and guide the focal point over the regions of the upper layer to be irradiated accordingly has an optical unit suitable for adapting the size of the focal point.

In a preferred refinement, the start of the irradiation of a section of the upper layer is delayed by a predetermined or predeterminable time interval selected in a manner dependent on the data record characterizing, at least in sections, the temperature profile of the layer lying immediately therebelow or in a manner dependent on the data records characterizing, at least in sections, the temperature profiles of the layers lying therebelow. Therefore, if the thermographic acquisition identifies regions with a high temperature or areas with high temperature gradients, an irradiation of the upper layer in these regions is initially postponed. Here, provision is made for the duration of the time interval delaying the irradiation to be selected in a manner dependent on an acquired maximum temperature or in a manner dependent on a maximum temperature gradient in order to achieve the best possible adaptation of the temperatures.

Accordingly, provision is made in a development of the invention for the irradiation of the section of the upper layer to be delayed until the temperature of the section of the upper layer, which is decisively determined by the temperature profiles of the layer or layers arranged therebelow, has sunk below a predeterminable threshold. Such a method is performable in a completely automated manner by means of an appropriately configured control device with logic circuits, processors or the like. The thermographic data records are preferably acquired at the same time with the production process such that the irradiation process of the section can be initiated as soon as the temperature has sunk below the predeterminable threshold.

The at least one temperature profile is acquired by means of a thermographic detector, which is therefore arranged by a building chamber having a building platform and acquires, at least in sections, the irradiation plane.

In a preferred exemplary embodiment, the temperature profile of the data record characterizing the respective layer is acquired section-by-section by means of a movably mounted thermographic detector which is movable over the entire irradiation area. Like a scanning head of a scanning device, the thermographic detector is movable independently of the alignment of the scanning apparatus of the laser beam such that, where necessary, it is also possible to acquire regions of the upper layer lying away from the surroundings around the focal point. Due to the time that has already elapsed since the irradiation, these regions have generally cooled down further, which may be important, in particular, for the selection of the initial point of the scanning path for irradiating the next layer.

In an alternative preferred exemplary embodiment, the temperature profile of the data record characterizing the respective layer is acquired by means of a stationary thermographic detector, which is arranged over the irradiation area and acquires the latter in the entirety thereof. A thermographic sensor embodied thus therefore allows the acquisition of the points corresponding to the cross section of the object to be produced in the entirety thereof. Hence, the data records acquired thus contain a thermographic snapshot of the upper layer which is taken into account for the purposes of optimizing the scanning path in respect of the generation of a homogeneous temperature profile.

Preferably, the thermographic data records, which are acquired by the movable or stationary thermographic detector, comprise image data which are output by way of a display unit, in particular during the generative production of the three-dimensional object. Therefore, the operating staff have available all the thermographic information to them, and so there can be a manual intervention into the production process where necessary. The different acquired temperatures can be output by way of suitable color coding.

Provision is made for the data record characterizing the temperature profile of the respective layer to be acquired when irradiating the respective layer. Accordingly, the thermographic acquisition is carried out simultaneously with the irradiation process in order to minimize the time outlay.

In an alternative exemplary embodiment, provision is made for the data record characterizing the temperature profile of the respective layer to be acquired after the respective layer was irradiated and after a powder layer of non-solidified building material was applied thereabove, from which powder layer the following layer of the component is intended to be formed in a further method step. This is advantageous in that the thermographic acquisition contains a dissipation of heat into the layer consisting of powder material arranged thereabove. Accordingly, it is possible for a predetermined time interval after the application of the new upper powder layer to be predeterminable, only after which the recording of the thermographic measurement data is started. As a result of this, sufficient time for dissipating the heat is available.

The previous explanations are directed to specifying a method by means of which the building process of an individual component can be optimized. However, generative building methods such as electron beam or laser sintering or laser melting are increasingly also used for mass production. Preferably, provision can therefore be made for the thermographic data records of at least one component to be stored in a storage device and for at least one of the thermographic data records to be used to control the irradiation of a layer of a component manufactured later in time. Thus, the knowledge from a preceding building process is used to improve the next building process. This is of interest, in particular, in the case of identical or at least partly identical components.

In so doing, those thermographic data records which, within the scope of the building process, correspond to the irradiated layer or a subsequent layer are preferably taken into account when irradiating a layer. What this means is that when e.g. the second layer of a component is irradiated, the thermographic data records of the second and/or the third layer of one or more previously manufactured components are taken into account. Taking into account the identical layer number brings about an acceleration in the calculation or an accelerated predetermination of the scanning path since local temperature maxima are already considered to be known. Scanning paths can therefore be calculated in advance in a layer-dependent manner. By contrast, taking into account at least one subsequent layer, i.e., for example, the third layer, allows the anticipatory avoidance of too strong temperature gradients in the subsequent layer.

The components manufactured in advance could have been manufactured simultaneously and/or in succession.

When taking into account the thermographic data records of components manufactured at the same time, averaging of the temperature information of the individual data records can be undertaken in order to average out statistical variations. By taking into account the thermographic data records of components manufactured in succession, an improvement of the scanning path can be achieved to the extent that a successive improvement of the scanning path is adapted. That is to say, the thermographic data records of a component manufactured first are initially used for improving the scanning paths of the next, i.e. the second, component. Equally, the thermographic data records of the second component are used to improve, i.e. avoid temperature gradients and/or local temperature peaks, a third component. Instead of running through this adaptation or improvement up to e.g. the tenth component, it is also possible to take into account the thermographic data records of a plurality of components manufactured successively, e.g. the first, second and third component. In a purely exemplary manner, this can be carried out by a time series-assisted analysis of the thermographic data records.

Particularly advantageously, the thermographic data records of a plurality of components manufactured simultaneously can be taken into account and these can be taken into account in a successive manner. As a result, the adaptation of the scanning path can be further optimized while avoiding statistical deviations.

An apparatus for selective laser powder processing, embodied to carry out the method according to the invention, comprises a preferably height adjustable building platform for receiving a powder bed made of solidifiable building material, a powder coating system for applying a powder layer onto the building platform, the laser radiation source for providing the focused laser beam which is incident on the powder layer for selectively solidifying the building material, the scanning device for guiding the focused laser beam along the scanning path, the—movably mounted or stationary—thermographic detector for acquiring the data records which characterize, at least in sections, the temperature profiles of layers consisting of solidified building material, and a control device for controlling the laser radiation source in a manner dependent on the acquired data records.

The data records can be stored in a storage device which has such an operational connection to the control device and the scanning device that the scanning path for producing the upper layer is controllable in a manner dependent on the data record which characterizes, at least in sections, the temperature profile of the layer lying directly below the upper layer to be irradiated or the scanning path is controllable in a manner dependent on the data records which characterize, at least in sections, the temperature profiles of the layers lying below the upper layer to be irradiated. An apparatus embodied thus enables efficient implementation of the method according to the invention, and so a production of high-quality objects or components is made possible.

In a preferred exemplary embodiment of the invention, a movably mounted detector is provided for acquiring the data record characterizing the temperature profile of the respective layer, which detector is movable in the style of a scanning head over the whole irradiation area in a manner independent of the movement of the scanning device. This enables the selective acquisition of regions of the irradiation plane which lie away from the immediate surroundings of the focal point.

Any sensors designed for acquisition of infrared radiation, such as, in particular, semiconductor sensors, thermal imaging cameras or the like, can be provided as thermographic detectors.

Figure 2:
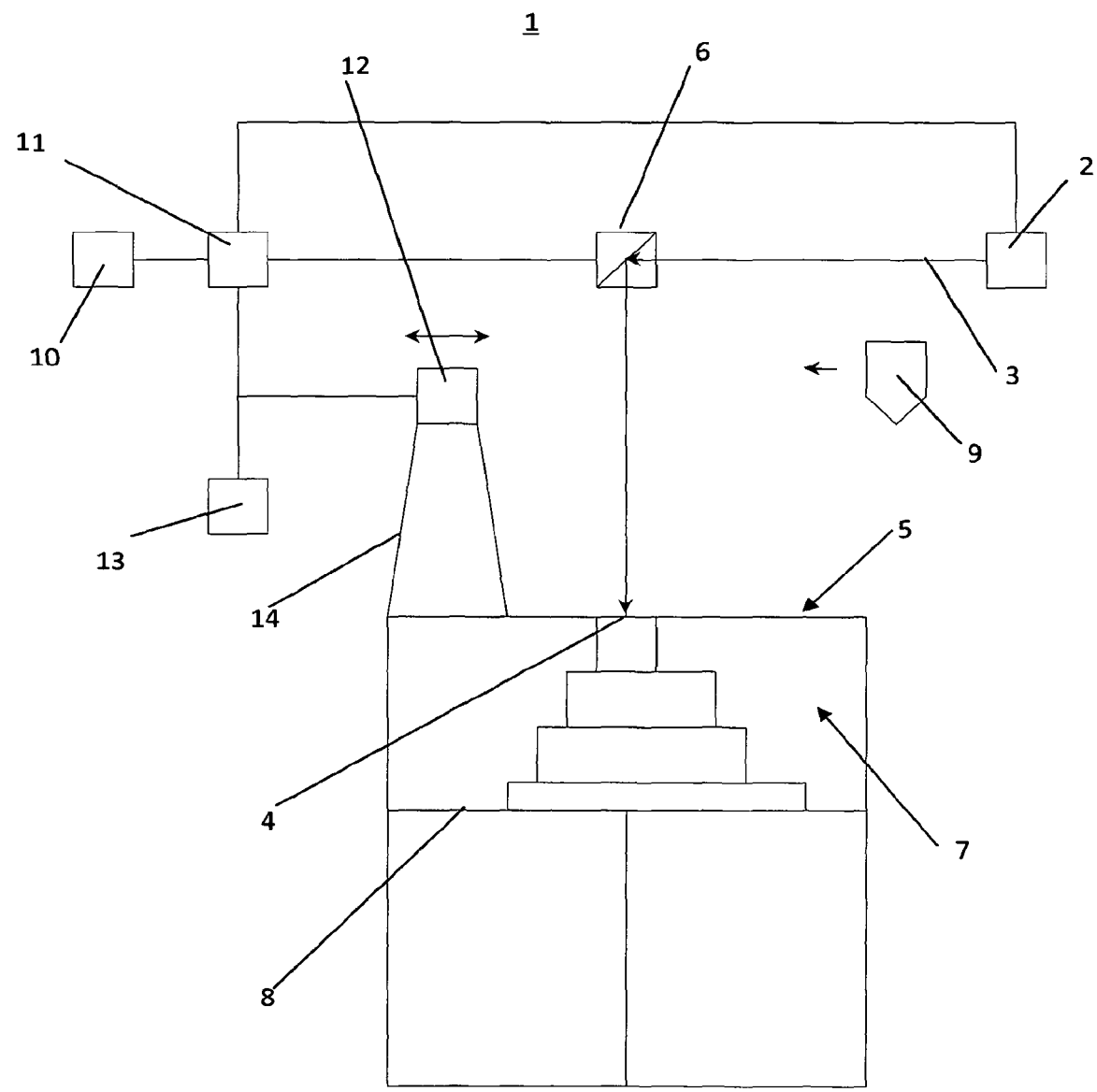
Figure 3:
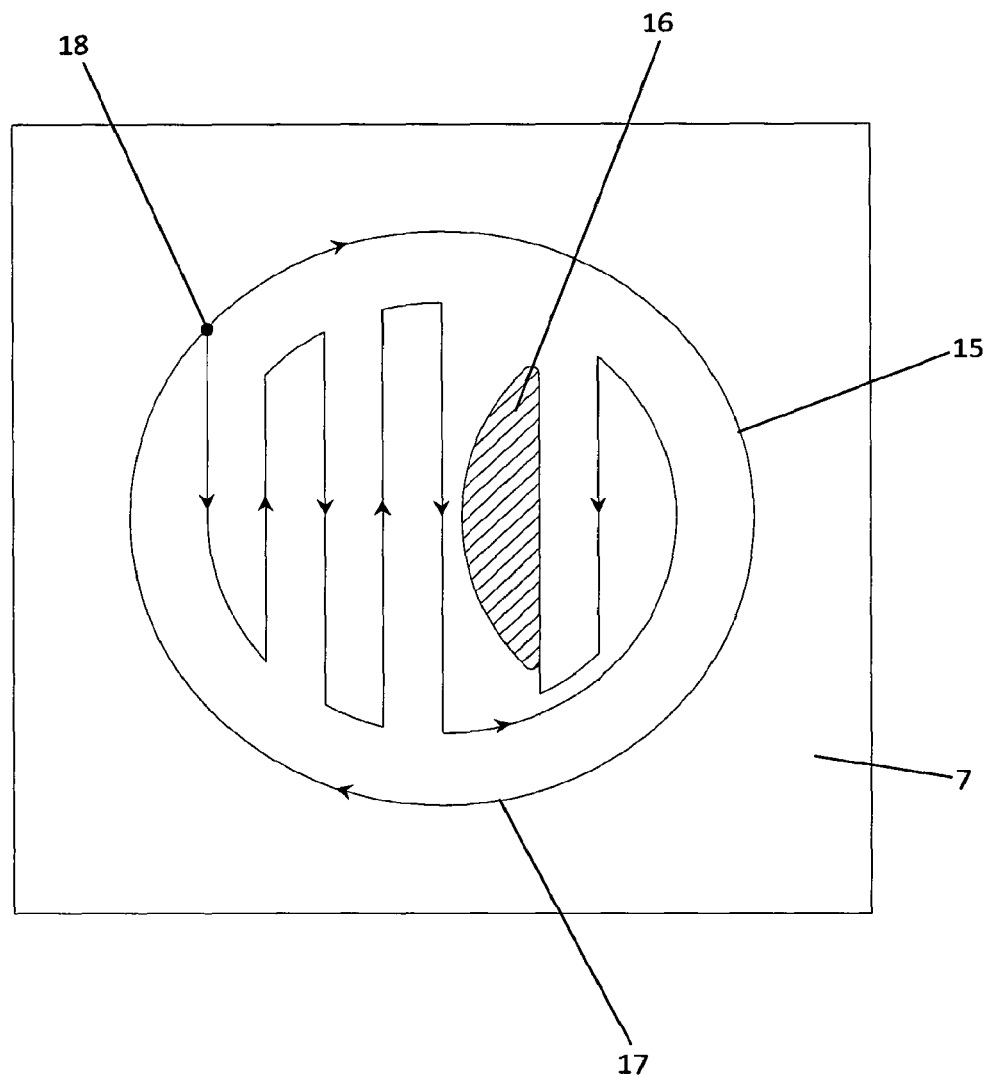

Below, the invention will be explained in more detail on the basis of specific exemplary embodiments, which are depicted in the figures of the drawing. In detail:

FIG. 1 shows a schematic design of an apparatus for selective laser powder processing in accordance with a first exemplary embodiment of the invention, FIG. 2 shows a schematic design of an apparatus for selective laser powder processing in accordance with a second exemplary embodiment of the invention, and FIG. 3 shows a plan view of an irradiation plane, wherein a scanning path of a laser beam is selected in a manner dependent on data records which characterize the temperature profiles of layers lying below the irradiation plane.

Parts corresponding to one another have been provided with the same reference sign in all figures of the drawing.

FIG. 1 shows an apparatus for selective laser powder processing, embodied to control an irradiation process in a manner dependent on thermographically acquired data. The apparatus 1 comprises a laser radiation source 2 for providing a laser beam 3. For the purposes of guiding a focal point 4 of the laser beam 3 over an irradiation plane 5, a scanning device 6 is equipped with a corresponding optics, such as, in particular, lenses, mirrors or the like. Powder layers made of building material which are solidifiable by the action of the laser beam 3 are arrangeable in a building chamber 7, which is bounded below by a height-adjustable building platform 8.

A powder coating system 9 which has a metering container for receiving building material and coating means for the uniform distribution of building material, such as doctor blades, rollers or the like, is provided for the layer-by-layer application of building material into the building chamber 7 or onto the building platform 8.

The apparatus 1 moreover has a storage apparatus 10, in which building data characterizing the three-dimensional form of the object to be produced or of the component to be produced are stored.

The scanning device 6 and the laser radiation source 3 are connected to the storage device 10 by way of a control device 11 such that process parameters of the laser beam source 2, and hence the scanning path of the laser beam 3 in accordance with the building data characterizing the object, are controllable.

A thermographic detector 12 is arranged over the irradiation plane 5 for the purposes of acquiring temperature profiles of irradiated layers. By way of the control device 11, the thermographic detector 12 is connected to the storage device 10 such that data records which characterize the temperature profiles of irradiated layers can be stored in the storage device for subsequent evaluation by the control device. The data records acquired by the thermographic detector 12 comprise image data which are displayable by means of a display unit 13 which, for example, comprises an LC (liquid crystal) display.

In the exemplary embodiment shown in FIG. 1, the thermographic detector 12 has a stationary arrangement and it is equipped with an acquisition region 14 which contains the entire irradiation plane 5. The thermographic detector 12, the storage device 10, the control device 11, the scanning device 6 and the laser radiation source 2 have such an operational connection that the scanning path of the laser beam 3 and further process parameters such as, in particular, the scanning speed of the laser beam, the size of the focal point, the laser pulse frequency, the laser pulse duration and/or the laser power are controllable in a manner dependent on the acquired temperature profiles.

FIG. 2 shows a schematic design of a second exemplary embodiment of the invention. Here, essential components correspond to the parts already described in relation to FIG. 1, and so only the differences are discussed below.

In contrast to the first exemplary embodiment, the thermographic detector 12 is movably mounted and displaceable over the entire irradiation plane 5 in the style of a scanning head. At a given instant, the acquisition region 14 of the detector 12 only covers part of the irradiation plane 5. The thermographic detector 12 is movable independently of the scanning device 6, and so it is also possible to acquire regions of the irradiation plane 5 which are situated away from the immediate surroundings of the focal point 4.

In a method for producing the three-dimensional component or the three-dimensional object by way of the laser melting method there is a layer-by-layer application of powdery building material and a layer-by-layer solidification of the building material at the points corresponding to the cross section of the component. After completing an irradiation process, the building platform 8 is lowered in order to enable an application of the next layer of non-solidified building material.

Provision is made for thermographic data records to be acquired by means of the detector 12, which thermographic data records characterize the temperature profiles of the just irradiated layer, possibly taking into account all temperature profiles of the layers arranged therebelow. In accordance with alternative embodiments, these data records are acquired simultaneously with an irradiation process occurring in the building chamber 7 or they are acquired at an instant after a layer was irradiated and a layer made of non-solidified building material, lying thereabove, was already applied. On the basis of the thermographic data records, the irradiation of the upper layer is controlled in such a way that the scanning path of the laser beam 3 is selected in a manner dependent on the temperature profiles characterizing the layer or layers lying under the upper layer. In particular, provision is made for the scanning path to be guided in such a way that hot regions are irradiated at a later stage in order to enable an intermediate equalization of the temperature gradients. This should avoid excessive regional heating.

In order to generate largely homogeneous temperature profiles, provision is made for further process parameters to be adapted in a manner corresponding to the acquired thermographic data records. Thus, an energy influx per unit area imparted by the laser beam may be reduced in regions of high temperature by virtue of the scanning speed of the laser beam, the size of the focal point, the laser pulse frequency, the laser pulse duration and/or the laser power being modified accordingly.

During the production process the image data contained in the thermographic data records are output by way of the display unit 13 such that manual intervention by operating staff is made possible where necessary. However, the method for generating largely homogeneous temperature profiles is suitable for being carried out fully automatically, for the purposes of which the control device 11 is equipped with corresponding evaluation electronics.

In addition to adapting process parameters and the scanning path, provision is made for the start of the irradiation of a section of the upper layer to be delayed in the case of a possibly too high regional action of heat. If regions of high temperature are registered during the thermographic acquisition, an irradiation of the upper layer is delayed until the temperature has sunk below a predeterminable threshold.

FIG. 3 schematically shows the irradiation plane 5 with an applied layer made of non-solidified building material 7 in a plan view. A contour 15 corresponds to the outline of a cross section of the component to be produced. Furthermore, a region 16 is depicted in a hatched manner in FIG. 3, said region corresponding to a region of increased temperature registered by the detector 12. In order to avoid too strong local fusion of the powdery building material 7, the scanning path 17 is selected in such a way that the region 16 is initially omitted. Proceeding from the initial point 18, the laser beam is initially guided along the contour 15 until the focal point of the laser beam 3 returns to the initial point 18. Then, the focus is guided along the zigzag-shaped scanning path 17 shown in FIG. 3 until the cross-sectional area of the object to be produced was completely covered with the exception of the region 16. Only then is the region 16, which has cooled down in the meantime, irradiated in a manner not depicted in any more detail.

It is understood that it is not necessary for a continuous path as shown in FIG. 3 to be described by the scanning path 17. Thus, for example, it is also possible to irradiate in succession regions of the irradiation plane 5 which are arranged in a manner separated in space from one another.

Furthermore, combinations of the shown exemplary embodiments are possible and envisaged within the scope of the present invention. In particular, it is possible to arrange a plurality of—stationary or movably mounted—thermographic detectors 12 for the purposes of acquiring the thermographic data records.

LIST OF REFERENCE SIGNS

1 Apparatus
2 Laser radiation source
3 Laser beam
4 Focal point
5 Irradiation plane
6 Scanning device
7 Building chamber
8 Building platform
9 Powder coating system
10 Storage device
11 Control device
12 Thermographic detector
13 Display unit
14 Acquisition region
15 Contour
16 Region
17 Scanning path
18 Initial point

The invention claimed is:

1. A method for producing a three-dimensional component, the method comprising:
receiving, with a building platform, a powder bed comprising solidifiable building material;
applying, with a powder coating system, a powder layer onto the building platform;
focusing, with a laser radiation source, a laser beam incident upon the powder layer;
guiding, with a scanning device, the laser beam to the powder layer, thereby selectively solidifying the building material;
acquiring, with a thermographic detector, temperature data comprising a temperature profile of one or more layers of the building material, the one or more layers comprising solidified building material;

storing, with a memory of a control device, the temperature data;

controlling, with a processor of the control device, the laser radiation source based at least in part on the temperature data;

determining, based at least in part on the temperature data, a region of local overheating in comparison to a surrounding region, the region of local overheating including a layer of the building material, wherein a next powder layer situated directly above the layer of building material includes at least one portion of the next powder layer within the region of local overheating; and determining, based at least in part on the temperature data, a scanning path for irradiating the next powder layer so as to initially irradiate the surrounding region with the radiation source prior to irradiating the at least one portion of the next powder layer within the region of local overheating; and controlling the laser radiation source so as to irradiate the next powder layer according to the scanning path.

2. The method of claim 1, wherein the thermographic detector comprises a movably mounted thermographic detector, the movably mounted thermographic detector being movable independently of the scanning device.

3. The method of claim 2, wherein the movably mounted thermographic detector is configured as a scanning head, movable over at least a portion of an irradiation area.

4. The method of claim 2, wherein the temperature data is acquired section-by-section while the movably mounted thermographic detector moves over at least a portion of an irradiation area.

5. The method of claim 1, further comprising modifying, with the control device, an energy influx per unit area imparted by the laser radiation source based at least in part on the temperature data.

6. The method of claim 5, wherein the modifying, with the control device, the energy influx per unit area comprises modifying a scanning speed of the laser radiation source, a size of a focal point of the laser radiation source, a laser pulse frequency of the laser radiation source, a pulse duration of the laser radiation source, and/or an output power of the laser radiation source.

7. The method of claim 1, further comprising:
delaying, with the control device, irradiation of at least part of the next powder layer until determining, based at least in part on the temperature data, that the region of local overheating has cooled below a temperature threshold.

8. The method of claim 7, further comprising:
delaying, with the control device, irradiation of the entirety of the next powder layer until determining, based at least in part on the temperature data, that the region of local overheating has cooled below the temperature threshold.

9. The method of claim 1, wherein the thermographic detector comprises a stationary thermographic detector having an acquisition region comprising an entirety of an area irradiated by the laser radiation source.

10. The method of claim 1, wherein the thermographic detector is configured to acquire temperature data comprising a temperature profile corresponding to a first layer of building material after the laser radiation source has irradiated the first layer of building material.

11. The method of claim 10, wherein the thermographic detector is configured to acquire the temperature data comprising the temperature profile corresponding to the first layer of building material after the next powder layer has been applied over the first layer of building material.

12. The method of claim 1, further comprising:
controlling based at least in part on the temperature data, with the control device, irradiation of a layer of a component manufactured later in time.

13. The method of claim 12, further comprising:
controlling, based at least in part on the temperature data, with the control device, the irradiation of the layer of the component manufactured later in time, wherein the temperature data corresponds to at least two components manufactured earlier in time.

14. The method of claim 13, wherein the at least two components are manufactured simultaneously or in succession.

15. The method of claim 1, further comprising:
imparting a delay, with the control device, for controlling the laser radiation source so as to irradiate the next powder layer according to the scanning path, wherein the delay comprises a time interval selected based at least in part on a portion of the temperature data, the portion of the temperature data corresponding to the layer of building material situated immediately below the next powder layer.

* * * * *